United States Patent
Choe

(10) Patent No.: US 9,635,720 B2
(45) Date of Patent: Apr. 25, 2017

(54) ALTERNATING CURRENT (AC)-DIRECT CURRENT (DC) POWER BOOSTER AND AC-DC POWER CONTROL MODULE FOR AC AND DC ILLUMINATIONS

(71) Applicant: BOLTIER R&D, La Mirada, CA (US)

(72) Inventor: Hun Yong Choe, Cerritos, CA (US)

(73) Assignee: BOLTIER R&D INC., La Mirada, CA (US)

( * ) Notice: Subject to any disclaimer, the term of this patent is extended or adjusted under 35 U.S.C. 154(b) by 0 days.

(21) Appl. No.: 14/823,672

(22) Filed: Aug. 11, 2015

(65) Prior Publication Data

US 2015/0351180 A1   Dec. 3, 2015

Related U.S. Application Data

(62) Division of application No. 13/846,572, filed on Mar. 18, 2013, now Pat. No. 9,462,643.

(30) Foreign Application Priority Data

Nov. 16, 2012  (KR) .......................... 10-2012-0130473
Nov. 29, 2012  (KR) .......................... 10-2012-0136926

(51) Int. Cl.
*H02M 1/42*   (2007.01)
*H05B 33/08*  (2006.01)
(Continued)

(52) U.S. Cl.
CPC ............ *H05B 33/0815* (2013.01); *H02J 3/02* (2013.01); *H02J 3/32* (2013.01); *H02J 3/38* (2013.01);
(Continued)

(58) Field of Classification Search
CPC ...... H02J 9/00; H02J 3/32; H02J 3/385; H02J 3/02; H02J 3/38; H05B 35/00;
(Continued)

(56) References Cited

U.S. PATENT DOCUMENTS 5,194,858 A * 3/1993 Erwin ................. H02J 13/0096
                                                      307/140
6,380,696 B1* 4/2002 Sembhi ............... H05B 37/029
                                                      315/294
(Continued)

*Primary Examiner* — Thai Pham
(74) *Attorney, Agent, or Firm* — Novick, Kim & Lee, PLLC; Jae Youn Kim

(57) ABSTRACT

The AC-DC power booster includes an electromagnetic interference (EMI) filter circuit that is included to convert alternating current (AC) power from among applied AC power and direct current (DC) power, to DC power to be output; a power factor correction (PFC) circuit that is connected to the EMI filter circuit and stabilizes an output voltage; and a switching mode power supply (SMPS) circuit that is connected to the PFC circuit and is capable of generating AC and DC power at the same time; a maximum power point tracking (MPPT) circuit that applies the voltage output from the SMPS circuit between a drain and a source of a switching device; a battery that is charged by receiving power from a solar light energy source connected to the MPPT circuit; and an inverter that operates an AC home appliance with the power received in the battery.

5 Claims, 13 Drawing Sheets

(51) Int. Cl.
| | |
|---|---|
| *H02M 1/44* | (2007.01) |
| *H02M 1/10* | (2006.01) |
| *H02J 3/02* | (2006.01) |
| *H02J 9/06* | (2006.01) |
| *H02J 9/00* | (2006.01) |
| *H05B 35/00* | (2006.01) |
| *H02J 3/32* | (2006.01) |
| *H02J 3/38* | (2006.01) |
| *G05F 1/67* | (2006.01) |

(52) U.S. Cl.
CPC ........... *H02J 3/385* (2013.01); *H02J 9/00* (2013.01); *H02J 9/065* (2013.01); *H02M 1/10* (2013.01); *H02M 1/42* (2013.01); *H02M 1/44* (2013.01); *H05B 35/00* (2013.01); *G05F 1/67* (2013.01); *Y02B 10/14* (2013.01); *Y02B 10/72* (2013.01); *Y02E 10/58* (2013.01); *Y02E 70/30* (2013.01); *Y10T 307/406* (2015.04); *Y10T 307/625* (2015.04)

(58) Field of Classification Search
CPC .... H05B 37/02; H05B 33/08; H05B 33/0815; H02M 1/42; H02M 1/44
See application file for complete search history.

(56) References Cited

U.S. PATENT DOCUMENTS

| | | | |
|---|---|---|---|
| 2007/0205729 A1* | 9/2007 | Garbowicz | H05B 41/46 315/299 |
| 2012/0092897 A1* | 4/2012 | Hara | H02J 9/005 363/16 |
| 2012/0286940 A1* | 11/2012 | Carmen, Jr. | F21V 33/0052 340/12.5 |

* cited by examiner

ALTERNATING CURRENT (AC)-DIRECT CURRENT (DC) POWER BOOSTER AND AC-DC POWER CONTROL MODULE FOR AC AND DC ILLUMINATIONS

CROSS-REFERENCE TO RELATED PATENT APPLICATION

This application is a divisional of U.S. patent application Ser. No. 13/846,572 filed on Mar. 18, 2013, which claims the benefit of Korean Patent Application Nos. 10-2012-0130473, filed on Nov. 16, 2012 & 10-2012-0136926, filed on Nov. 29, 2012, in the Korean Intellectual Property Office, the disclosures of which are incorporated herein in their entirety by reference.

BACKGROUND OF THE INVENTION

1. Field of the Invention

The present invention relates to a alternating current (AC)-direct current (DC) power booster and a power control module for AC-DC illumination, and more particularly, to an AC-DC power booster that is capable of remotely transferring DC power through an AC-DC power line and preparing for a power failure in the event of an emergency and a power control module for AC-DC illumination, the power control module providing AC power and DC power at the same time, preventing an over-current, maintaining a rated voltage of a necessary load, controlling luminance of a light emitting diode (LED) illumination instrument, individually controlling illumination instruments by using a remote controller, and allowing an increase in the life time of the illumination instruments and reduction in power consumption.

2. Description of the Related Art

Normal power that is generally used is divided into an alternating current (AC) power and a direct current (DC) power. Besides the normal power, a ripple current may also be present. In addition, AC power has a frequency unlike DC power, and this frequency varies according to countries but 60 Hz and 50 Hz are used in general.

Unlike AC power, DC power is not easily transmitted, but may be easily stored in a battery. On the other hand, AC power cannot be stored in a battery. Thus, DC and AC powers are used according to their respective advantages and disadvantages.

A switching mode power supply (SMPS) is a power conversion device including a converter unit that converts AC to DC, an inverter unit that converts the DC to AC again by using a radio frequency power converting device at a high frequency of about several tens to several hundreds of KHz, and another converter unit that converts this AC to DC. In particular, required power may be obtained by dropping or raising a voltage according to a desired load by using a radio frequency transformer consisting of a ferrite core located at an output end of the inverter unit and then by rectifying and smoothing the voltage.

In addition, a transformer or a condenser having a small capacity may be used in a radio-frequency SMPS method, and thus, the radio-frequency SMPS method is advantageous in terms of efficiency compared to a linear type power converting method. Although the radio-frequency SMPS includes complex components and radio frequency noise generated during switching thereof affects peripheral electric electronic appliances, since the power conversion efficiency of the SMPS is better than a linear type power converting device, the SMPS is widely used not only in adapters used in TVs, PCs, or laptop computers but in compact charging equipment used for mobile phones.

In the past ten years, many countries have strived to reduce the abrupt increase in power consumption; as one measure, various illumination loads are replaced with light emitting diodes (LEDs). The LEDs, which are contributing to reduction of an illumination load that makes up about 10% of the total power used, are being highlighted.

This is because LEDs are capable of emitting light at a very low voltage and a very small current. While the LEDs have low power consumption, they are vulnerable to an instantaneous over-voltage and over-current due to grid lines or power converting devices.

Moreover, while the SMPS type power converting devices as described above are typically used as power circuits for driving the LEDs, the SMPS type power converting devices are also vulnerable to noise and a surge voltage that may occur instantaneously and unexpectedly. Consequently, these become the cause of defects with respect to an LED illumination load, resulting in damage to persons or assets.

Also, while the policy is that LED illumination is recommended for the reason that LED devices are capable of remarkably reducing an illumination load, in reality, normal AC power is mostly used as power for LED illumination. Thus, regarding power supply systems that are presently used, no other benefits of using DC power are obtained other than the effect of reducing energy consumption due to the use of the LED devices having small power consumption.

Accordingly, technology is required that allows total management of AC and DC power with respect to an illumination instrument so as to efficiently use the illumination instrument, increase the lifespan of the illumination instrument, and reduce consumption of electrical energy.

SUMMARY OF THE INVENTION

The present invention provides an alternating current (AC)-direct current (DC) power booster that is easily installed and detachable, may be easily moved to a place where power may be supplied to charge a battery of the power booster so that the battery may be easily charged with solar light energy or with power of a vehicle supplied through an external charging circuit, and includes an inverter that is mounted in the AC-DC power booster so as to supply power to AC home electronic appliances in the event of an emergency.

The present invention also provides a power control module for an AC and DC illumination instrument which controls power of the AC and DC illumination instruments so as to allow effective use of the illumination instruments, increase the lifespan of the illumination instruments, and reduce power consumption.

According to an aspect of the present invention, there is provided a power booster comprising: an electromagnetic interference (EMI) filter circuit that is included to convert AC power from among applied AC power and DC power, to DC power to be output; a power factor correction (PFC) circuit that is connected to the EMI filter circuit and stabilizes a predetermined output voltage; and a switching mode power supply (SMPS) circuit that is connected to the PFC circuit and applies the DC power of the PFC circuit to a drain of the SMPS circuit through a transformer, the SMPS circuit being capable of generating AC and DC power at the same time; a maximum power point tracking (MPPT) circuit that applies the voltage output from the SMPS circuit between a drain and a source of a switching device; a battery that is charged by receiving power from a solar light energy source connected to the MPPT circuit; and an inverter that uses a synchronization signal of an emergency energy source as an oscillation signal and operates an AC home appliance with the power received in the battery.

According to another aspect of the present invention, there is provided a power control module for AC-DC illumination, comprising: an AC-DC optical module that receives DC power applied through a hot wire, a neutral wire, and a ground wire; a power switch that controls the hot wire, the neutral wire, and the ground wire and the AC-DC optical module; a remote controller that operates the AC-DC optical module; and an AC lamp and a light emitting diode (LED) lamp that receive the DC power from the AC-DC optical module.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A power booster according to an embodiment of the present invention includes: an electromagnetic interference (EMI) filter circuit that is included to convert alternating current (AC) power from among applied AC power and direct current (DC) power, to DC power to be output; a power factor correction (PFC) circuit that is connected to the EMI filter circuit and stabilizes a predetermined output voltage; and a switching mode power supply (SMPS) circuit that is connected to the PFC circuit and applies the DC power of the PFC circuit to a drain of the SMPS circuit through a transformer, the SMPS circuit being capable of generating AC and DC power at the same time; a maximum power point tracking (MPPT) circuit that applies the voltage output from the SMPS circuit between a drain and a source of a switching device; a battery that is charged by receiving power from a solar light energy source connected to the MPPT circuit; and an inverter that uses a synchronization signal of an emergency energy source as an oscillation signal and operates an AC home appliance with the power received in the battery.

The inverter may further include a function of stopping the inverter when charged DC power is reduced to a reference value or less and notifying that the battery is in a low voltage state by using an alarm or a light emitting diode (LED) lamp.

The emergency energy source may include one of solar light energy, wind power energy, and power of a vehicle.

Also, the battery may neutralize noise that is instantaneously generated in an oscillation circuit of the SMPS circuit.

The MPPT circuit may select a voltage and, if there is DC power applied through an external input terminal, may stop an output of the SMPS circuit to reduce power consumption.

A break fuse switch that supplies power of the battery may be included between the MPPT circuit and the inverter.

Also, the inverter may receive power from an inverter power unit.

Furthermore, an inverter oscillation circuit that allows generation of an AC in the inverter may be included.

In addition, an AC-DC power plug may be connected to the EMI filter circuit to turn on or off the power booster, and an AC-DC switch may be connected to the EMI filter circuit.

The present invention will now be described more fully with reference to the accompanying drawings, in which exemplary embodiments of the invention are shown.

Figure 1:
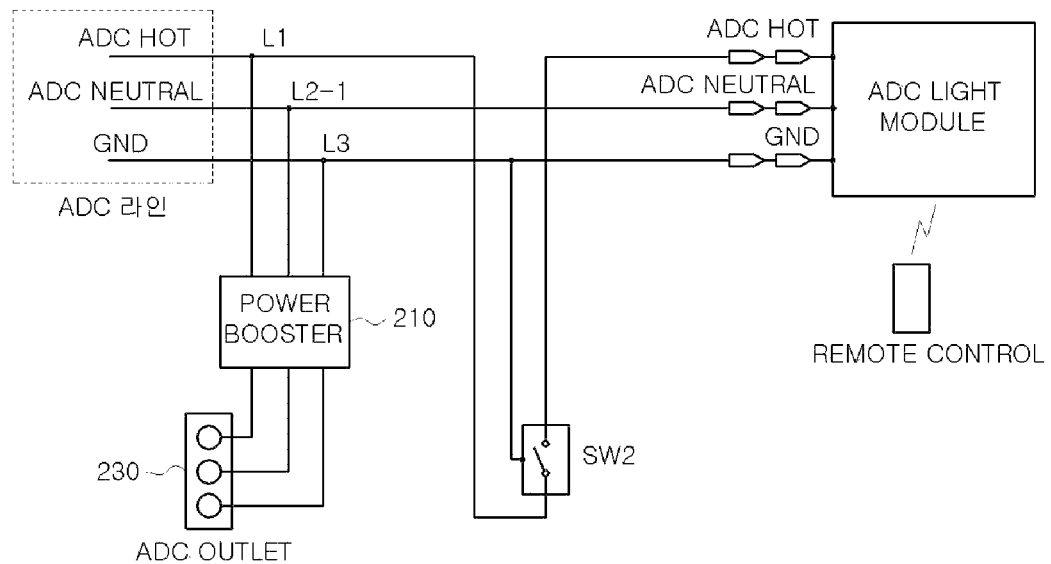
FIG. 1 illustrates a position of a booster circuit according to an embodiment of the present invention.
Figure 2:
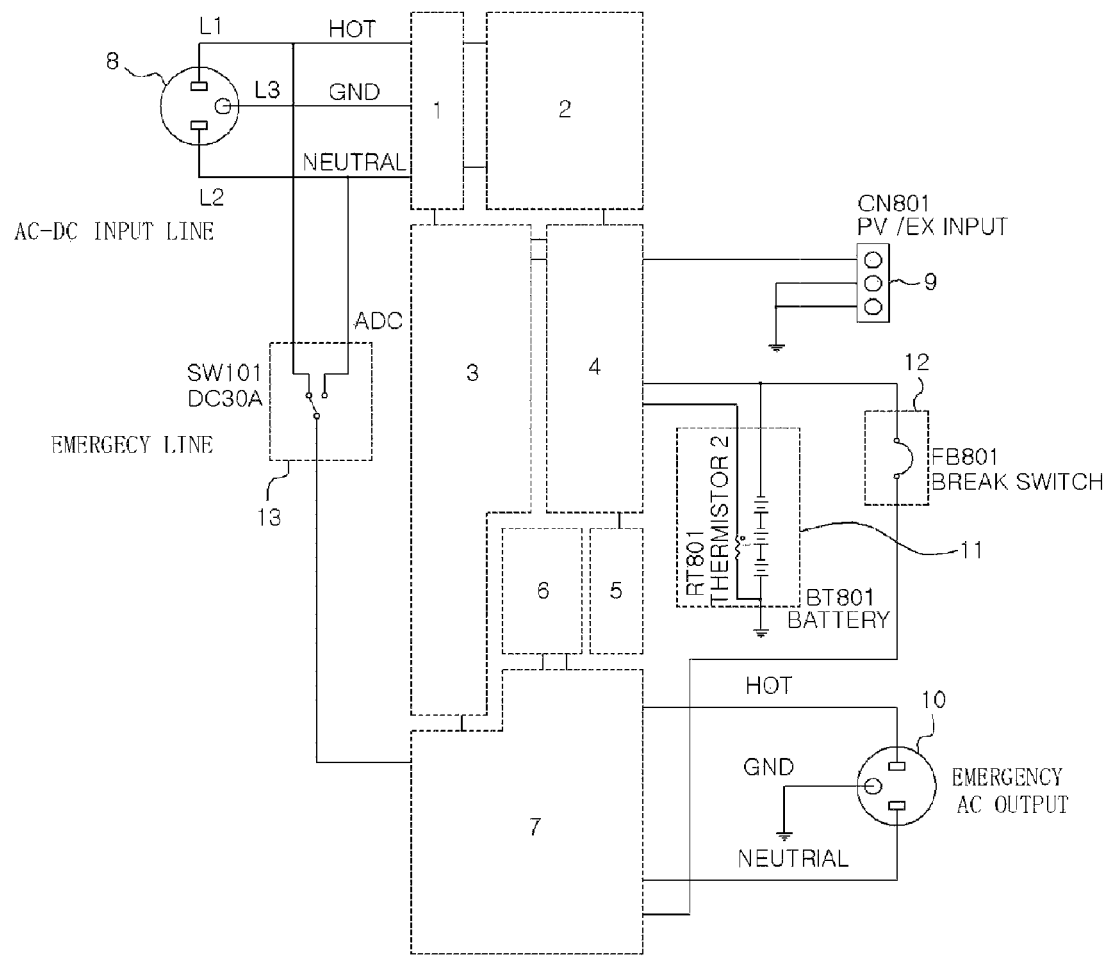
FIG. 2 is a block diagram illustrating a power booster according to an embodiment of the present invention.

FIG. 1 illustrates a position of a booster circuit according to an embodiment of the present invention. FIG. 2 is a block diagram illustrating a power booster 210 according to an embodiment of the present invention. FIGS. 3A through 3I are detailed circuit diagrams of the power booster 210 according to an embodiment of the present invention.

Referring to FIG. 1, the power booster 210 is disposed between an AC-DC line, through which power is supplied in an AC-DC power supply system, and an AC-DC outlet 230, and AC power and DC power are applied to the power booster 210 through an AC-DC line, and the applied AC power is supplied to an electromagnetic interference (EMI) filter circuit 1 included in the power booster 210 through a hot wire L1 and a neutral wire L2-1.

Hereinafter, the power booster 210 will be described with reference to FIGS. 2 and 3A through 3I.

The EMI filter circuit 1 illustrated in the detailed circuit diagram of FIG. 3A will be described below.

Figure 3A:
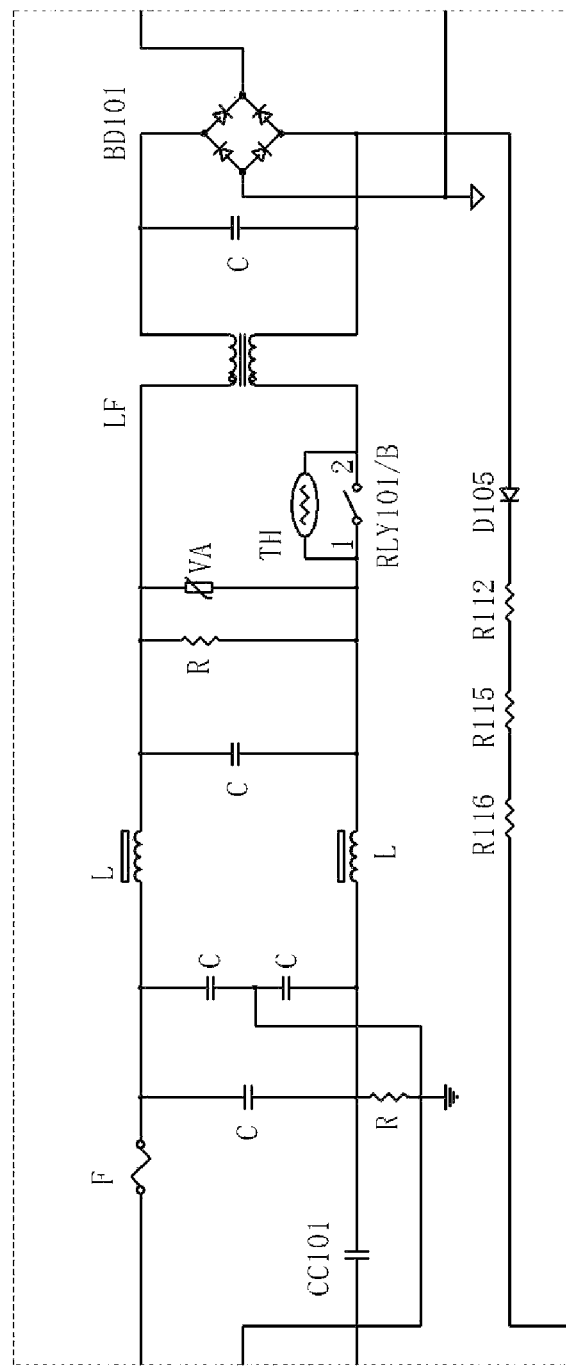
FIGS. 3A through 3I are detailed circuit diagrams of a power booster according to an embodiment of the present invention.

AC power of the applied AC-DC power is input through the hot wire L1, the neutral wire L2-1, and a ground wire GND L3 as illustrated in FIG. 1, DC power is input through the neutral wire L2-1 and the ground wire GND L3 but is blocked by a condenser CC101 of FIG. 3A, and RL101/B denotes a relay switch for a power switch.

Figure 3B:
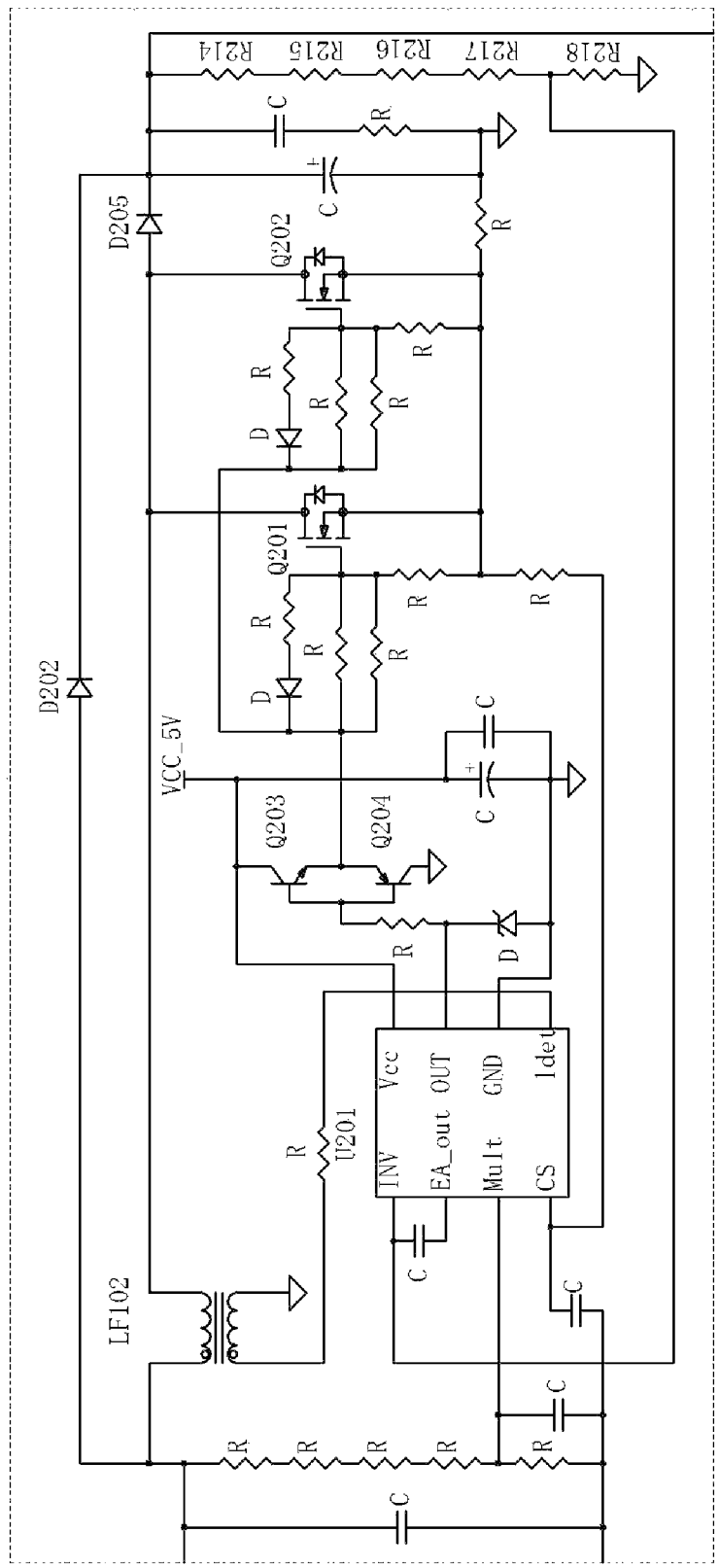

AC power applied to a rectifying diode BD101 is converted to DC power and output, and this DC power is applied to a power factor correction (PFC) circuit 2 (see FIG. 3B).

The PFC circuit 2 is a boost up circuit for increasing a voltage in order to increase an efficiency of a switching mode power supply (SMPS) circuit 3, and a positive (+) voltage of the DC power applied through the rectifying diode BD101 of FIG. 3A is applied to a drain of a switching device Q202 through a low-pass filter LF102, and a negative (−) voltage of the DC power is applied to an internal circuit of the PFC circuit 2 through a hot ground terminal HOT GND.

Here, an integrated circuit (IC) U201 illustrated in FIG. 3B oscillates to operate gates of switching devices Q201 and Q202 through switching devices Q203 and Q204 at an output end thereof, thereby turning on or off a current between a drain and a source of the switching devices Q201 and Q202 and boosting up the DC power applied to the drains of the switching devices Q201 and Q202.

A diode D205 is included to rectify an AC component of the boosted up voltage, and a diode D202 is a damper diode for sufficiently supplying a current.

In addition, resistors R214, R215, R216, R217, and R218 are for dividing resistances in order to adjust a predetermined output voltage, and the IC U201 stabilizes the predetermined output voltage by conforming to a time constant, while repeating on/off oscillation.

The SMPS circuit 3 is divided into two portions.

In the first portion (see FIG. 3C), DC power input to the PFC circuit 2 is applied to a drain of an IC U602 through a transformer T102. The IC U602 of FIG. 3C rectifies AC power via a diode D105 in the EMI filter circuit 1 of FIG. 3A to reduce a voltage by sequentially using resistors R112, R115, and R116 and a resistor R114, and then the voltage is stabilized by using a Zener diode ZD102 and a capacitor C103, thereby supplying soft start power through a switching device Q104 and a resistor R113.

Figure 3C:
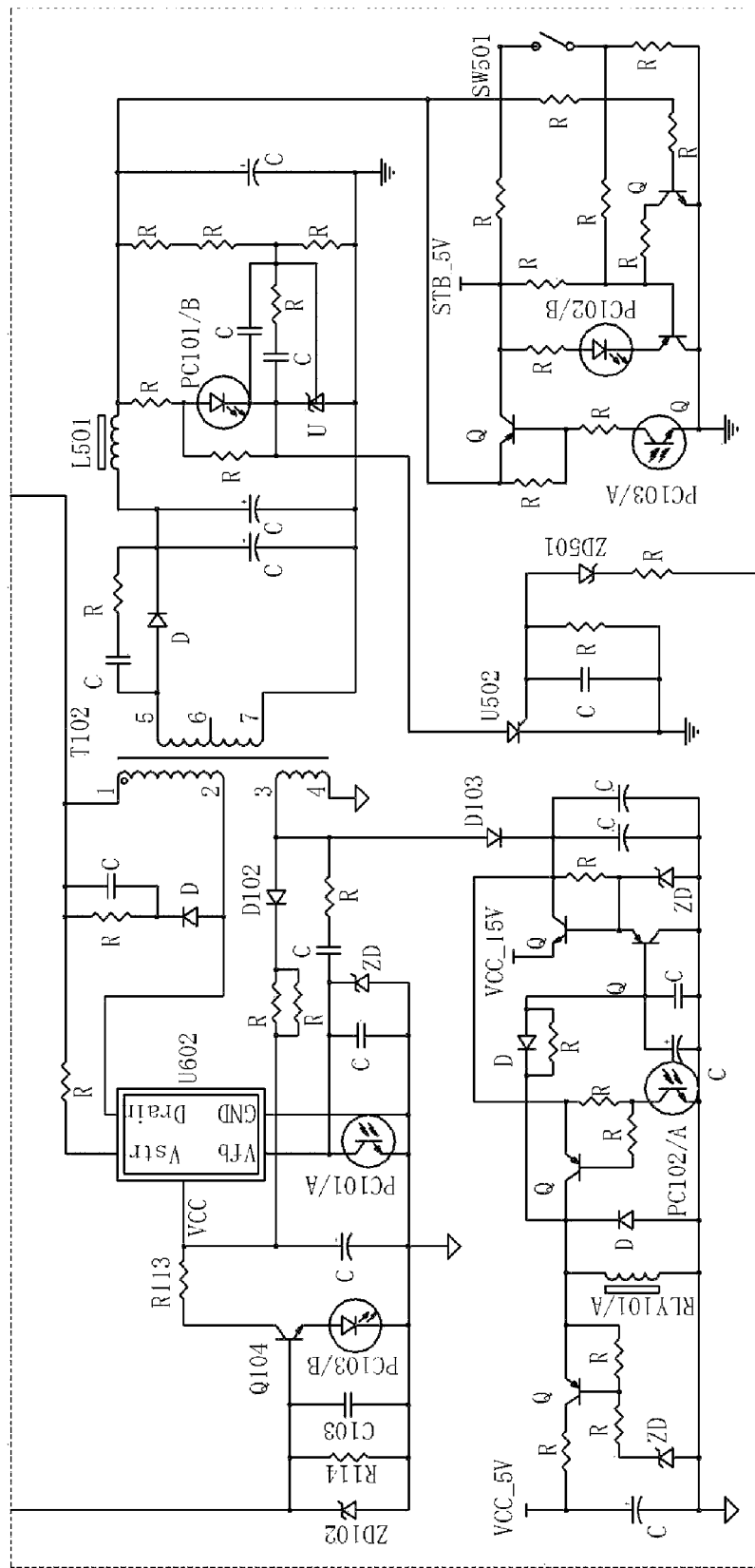

Here, a photo-coupler PC103/B operates and rectifies an AC voltage output from terminals 3 and 4 of the transformer T102 via diodes D102 and D103 so as to stabilize the same to be a constant voltage and supplies power to the IC U201 of FIG. 3B and the IC U602 of FIG. 3C.

Terminals 5 and 7 of the transformer T102 supply a collector voltage VCC of 5V, photo-couplers PC101/B and PC101/A conduct switching for the purpose of supplying a stabilized voltage STB VCC of 5V, and a switch SW501 is a main power switch that turns on the photo-coupler PC102/B to drive the relay RLY101/A via the photo-coupler PC102/A, thereby turning on power VCC of 5V. An IC U502 and a Zener diode ZD501 block power by stopping the IC U601 in the case when a battery is overcharged.

In the second portion (see FIG. 3D), DC power is applied to switching devices Q601 and Q602 in the PFC circuit 2. Here, the IC U601 oscillates to output a high voltage HVG or a low voltage LVG so as to operate gates of the switching devices Q601 and Q602 via resistors R606 and R608 and switch the applied DC power to the hot ground terminal HOT GND through the switching device Q602, the switching device Q601, and a resistor R601 at a drain of the IC U601, and the DC power is applied to a primary side of a transformer T601.

AC power output from terminals 7, 8, and 9 of the transformer T601 is rectified by using diodes D705 and D706 to operate the SMPS circuit 3 and an output of the IC U601 is adjusted by using a photo-coupler 601/B and a photo-coupler 601/A in order to stably supply battery charging power output from terminals 4, 5, and 6 of the transformer T601.

Hereinafter, a maximum power point tracking (MPPT) circuit 4 will be described with reference to FIG. 3E.

Figure 3D:
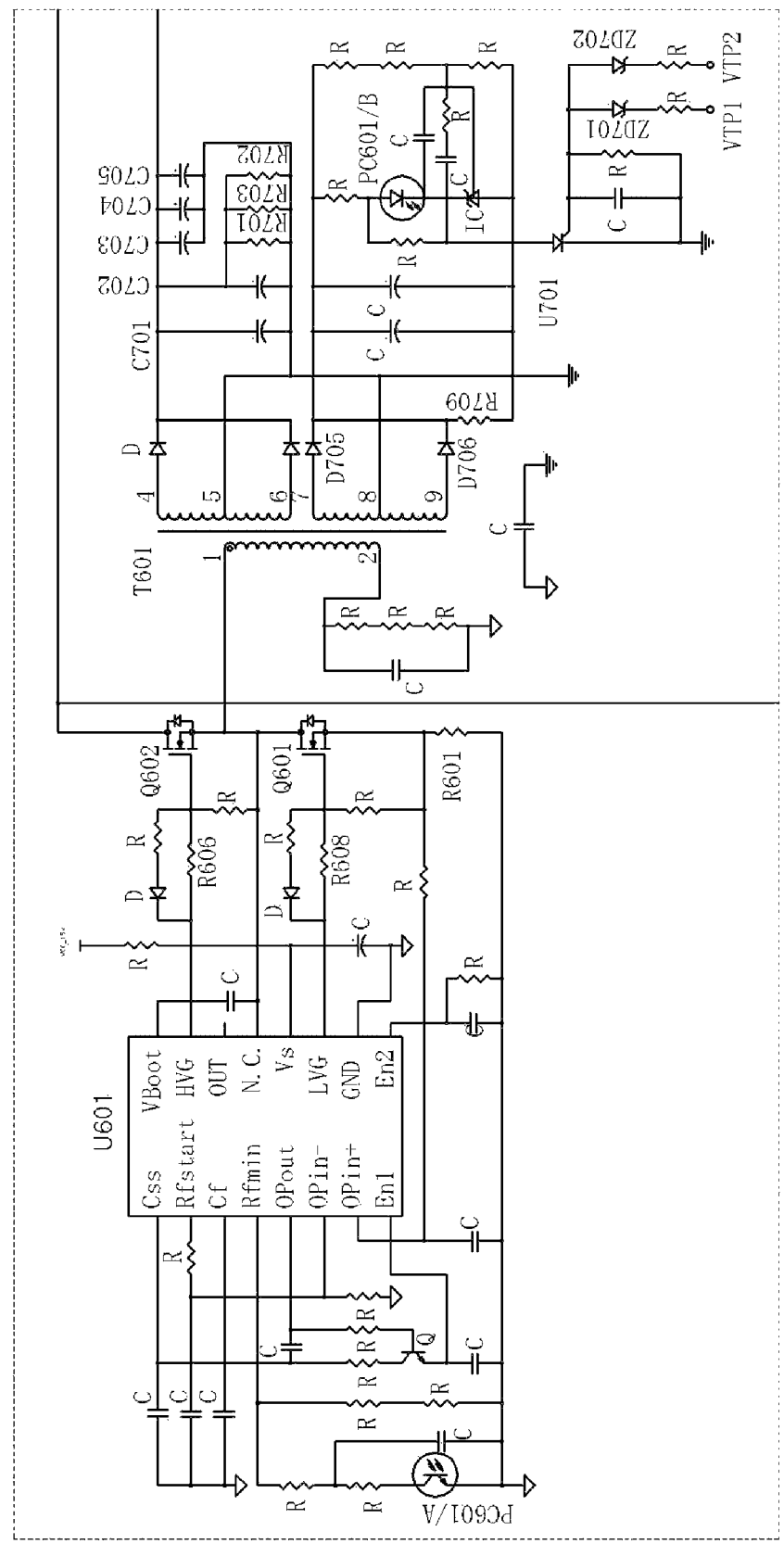
Figure 3E:
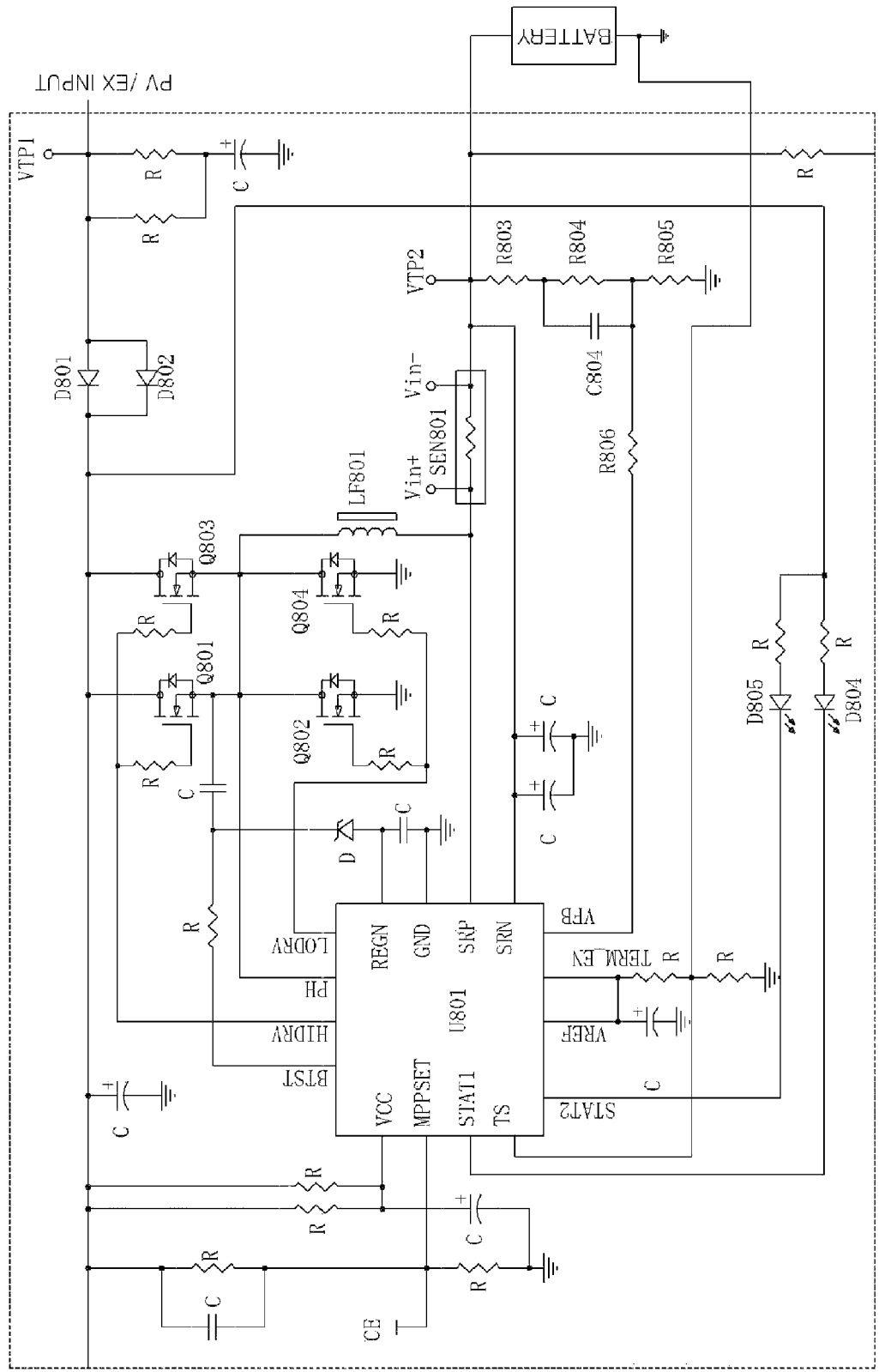

AC power output through terminals 4, 5, and 6 of a secondary side of the transformer T601 of FIG. 3D is rectified and smoothed by using condensers C701, C702, C703, C704, and C705 to stabilize the AC power via resistors R701, R702, and R703, and the AC power is output to the MPPT circuit 4.

Here, an IC U701 and Zener diodes ZD701 and ZD702 select voltages VTP1 and VTP2 of the MPPT circuit 4 and stop an output of the SMPS circuit 3 if there is DC power applied to an external input terminal to thereby reduce consumption of normal power.

The voltage output from the SMPS circuit 3 is applied between a drain and a source of each of switching devices Q801, Q802, Q803, and Q804, and DC power that is applied through an input terminal PV/EX, which is an external input terminal, is also applied through diodes D801 and D802. An IC U801 charges a battery 11 that is connected to a load according to predetermined time constants with respect to resistors R803, R804, R805, and R806, and supplies DC power output to an AC-DC power line through a break fuse switch 12 FB801.

When charging the battery 11, an LED D804 is turned on, and when battery charging is completed, an LED D805 is turned on, and when a defect occurs during charging or when overcharging occurs, the LEDs enter a sleep mode, and if there is no battery, the LEDs D804 and D805 are both turned off.

Hereinafter, an inverter 7 will be described.

In the event of an emergency, AC home appliances for storage of food, medical products or infant paraphernalia may be operated using power of a battery charged using the supply of AC power. DC power of the battery 11 is applied to drains of switching devices Q907, Q908, Q909, and Q910 of FIG. 3H through the ground wire GND and a transformer T902 of the inverter 7 (see FIG. 3I) through the terminal break fuse switch 12 FB801.

Figure 3F:
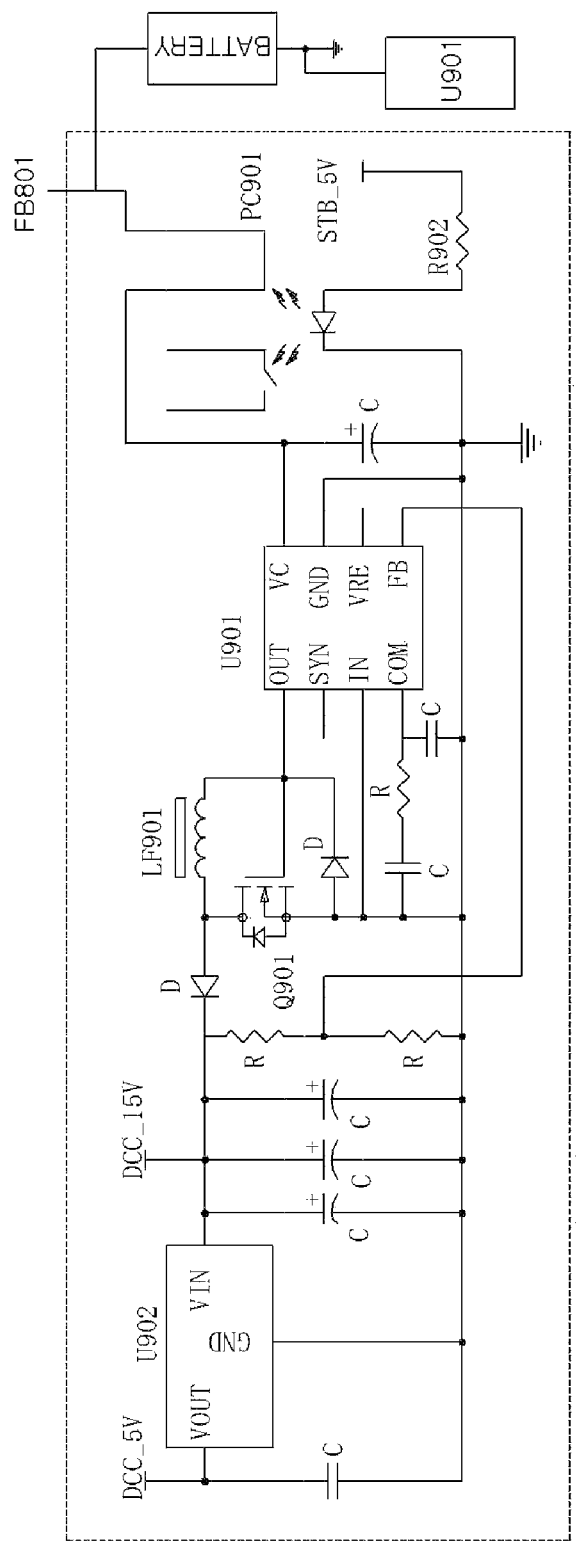

An inverter power unit 5 illustrated in FIG. 3F supplies power to an IC U901 through a photo-coupler PC901, and switches using a switching device Q901 so as to obtain a stable constant voltage DCC of 15 V, and generates a voltage DCC of 5V by using an IC U902. Power with respect to both the constant voltage DCC of 15V and the voltage DCC of 5V is supplied to ICs U903, U904, U905, and U906 of an inverter oscillation circuit 6 and the inverter 7 (refer to FIGS. 3G, 3H, and 3I).

In addition, when a voltage STB of 5 V is output, a circuit of a photo-coupler PC901 of FIG. 3F operates to block power supplied to the inverter 7. The output of the voltage STB of 5V indicates that normal AC power is being supplied and thus there is no need to output AC power to the inverter 7 or indicates that charging is being conducted.

Figure 3G:
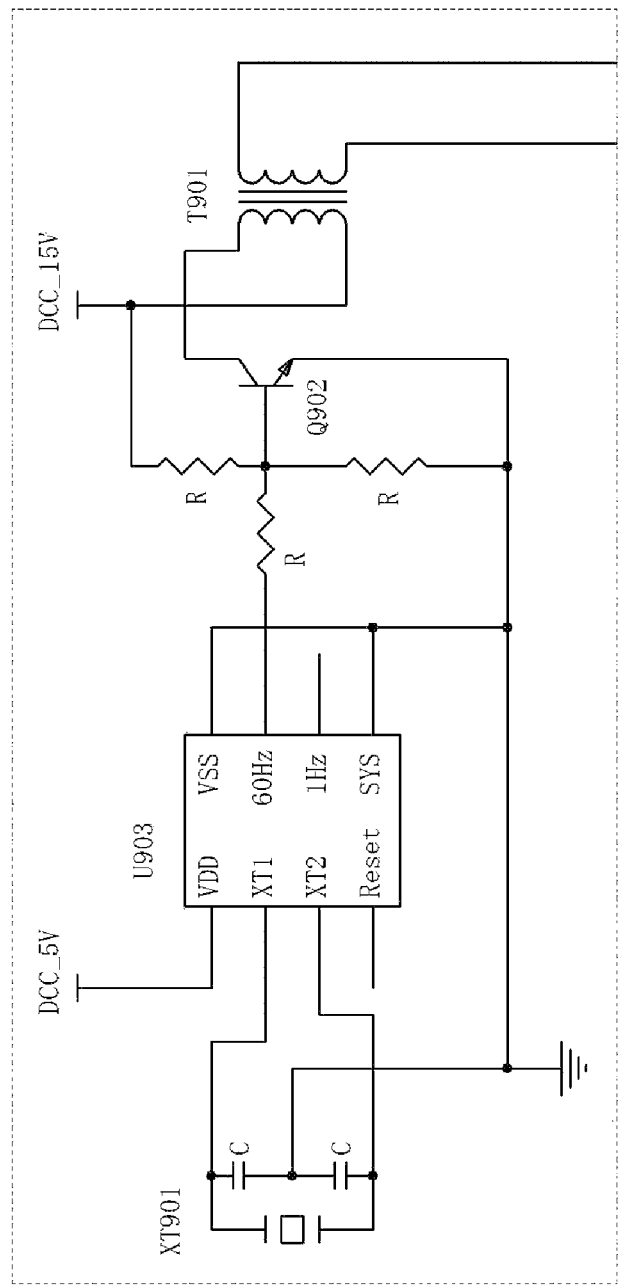
Figure 3H:
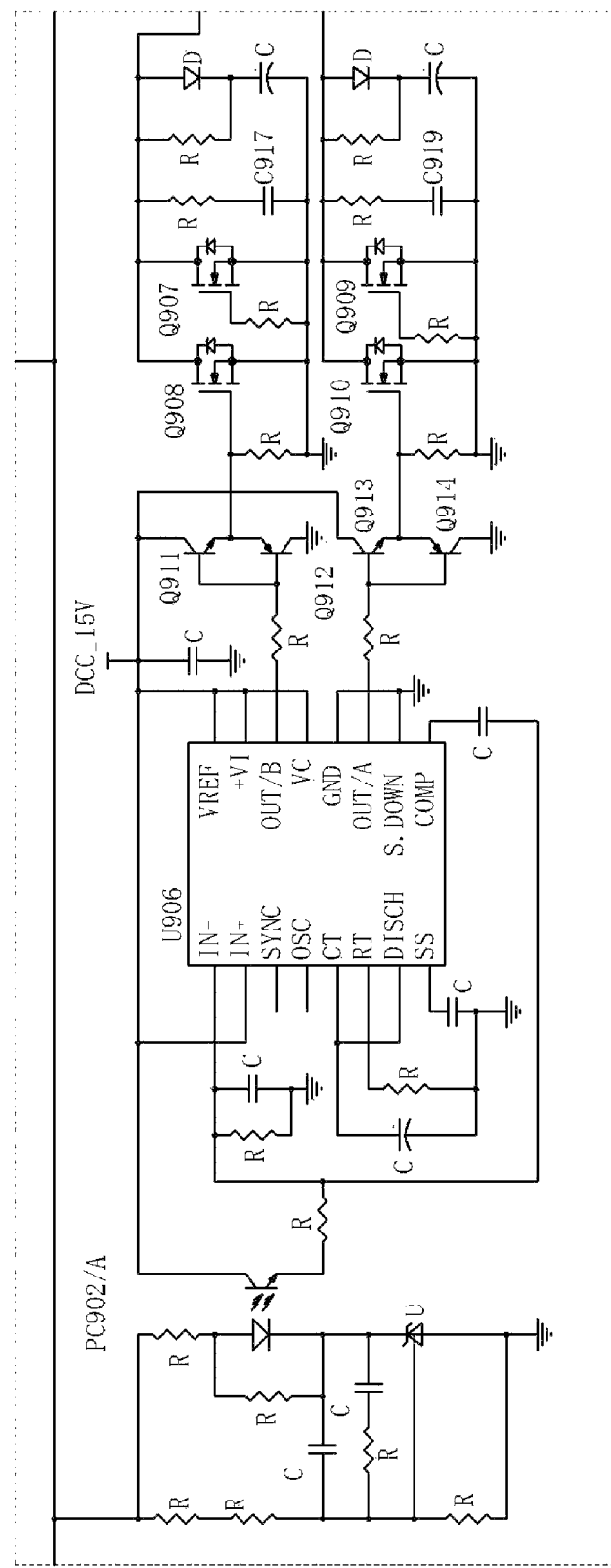

In addition, as illustrated in FIG. 3H, an IC U906 oscillates and outputs the DC power to output terminals OUT/A and OUT/B, and the DC power is passed through switching devices Q911, Q912, A913, and Q914 to operate gates of the switching devices Q907, Q908, Q909, and Q910, and DC power applied to the battery 11 is switched to be applied to a primary side of the transformer T902, and the boosted-up AC power is rectified by using diodes D910, D911, D912, and D913 at a secondary side thereof and is smoothed by using condensers C912, C913, and C914 to be applied to collectors and emitters of switching devices Q903 and Q904 and Q905 and Q906.

Also, the IC U903 illustrated in FIG. 3G is included to oscillate with a crystal oscillator XT901 so as to oscillate an AC signal of 60 Hz or 50 Hz and apply the AC signal to the ICs U904 and U905 through the transformer T901, and the DC power applied through the transformer T902 is separately switched in the ICs U904 and U905 from a positive (+) component of the AC signal oscillated in the IC U903. Then, the DC power source is applied to gates of the switching devices Q903 and Q904 and Q905 and Q906.

Figure 3I:
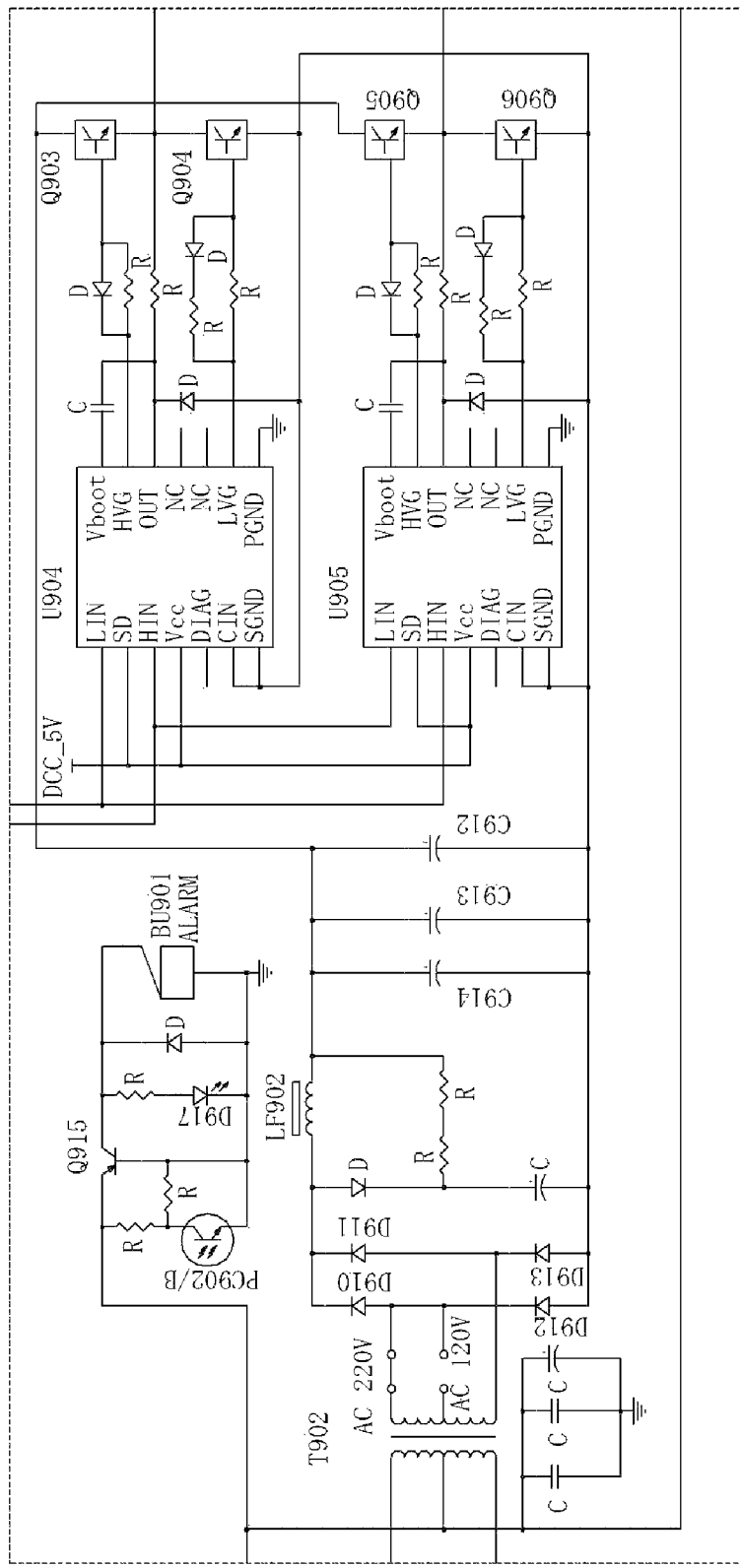

Referring to FIG. 3I, a current flows between the collector of the switching device Q903 and the emitter of the switching device Q904 and between the collector of the switching device Q905 and the emitter of the switching device Q906, and AC power of 120 V or 220 V (60 Hz/50 Hz) is output between the emitter of the switching device Q903 and the collector of the switching device Q904 and between the emitter of the switching device Q905 and the collector of the switching device Q906 to an output end of the power booster in the event of an emergency.

Here, if the inverter 7 is used for a long period of time without recharging, a charging current of the battery 11 is reduced causing a drop in a voltage to a predetermined reference value or lower, and a photo-coupler PC902/A operates to stop oscillation of the IC U906 in order to operate an LED illumination instrument or an electronic product, thereby stopping the operation of the inverter 7. Here, as illustrated in FIG. 3I, a photo-coupler PC902/B operates a switching device Q915 to turn on an LED D917 and an alarm BU901 rings to notify a corresponding operational status.

As described above, when DC power of the battery 11 applied through the break circuit switch 12 FB801 is used in the AC-DC power line, an AC-DC switch 13 enters an AC-DC mode to function as a power booster (see FIG. 2).

That is, DC power where a voltage drop occurs due to a resistance in power lines is supplied through the hot wire L1, the neutral wire L2-1, and the ground wire L3 that are lines usually used for normal AC power, and the DC power is boosted up and supplied through the neutral wire L2-1 and the ground wire L3. In the case of another emergency event, the DC power may also be used as emergency power for buildings which are damaged due to a disaster and where not the lines for an AC-DC power system but lines for normal AC power are used.

At the same time with turning off the AC-DC switch 13 for power conversion of normal power, by the AC-DC switch 13 entering an emergency mode and connecting the same to an outlet in a building, various electronic appliances such as LED lamps, computers, and inverters for DC power may be used without additional wirings for connecting to another outlet in the building.

Also, when used outdoors, power may be supplied to a load which is to be used outdoors by the AC-DC switch 13 entering an AC-DC mode and simply connecting a plug to an outlet included in the power booster 210 according to the current embodiment of the present invention.

Hereinafter, a power control module for AC and DC illumination according to an embodiment of the present invention will be described.

The power control module for AC and DC illumination receives power from a power supply module that simultaneously supplies AC and DC power like an AC and DC power supply module disclosed in KR 10-2012-089039.

Figure 4:
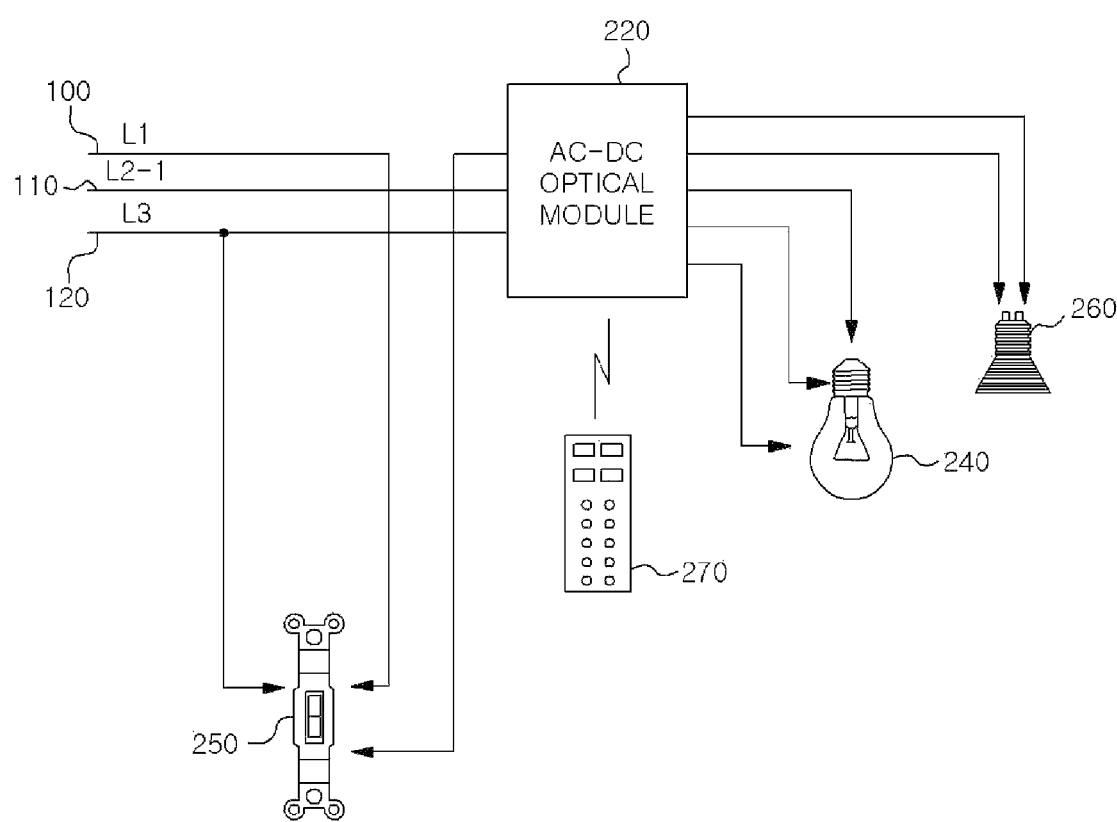
FIG. 4 is a peripheral circuit diagram illustrating a power control device for alternating current (AC) and direct current (DC) illumination, according to an embodiment of the present invention.
Figure 5:
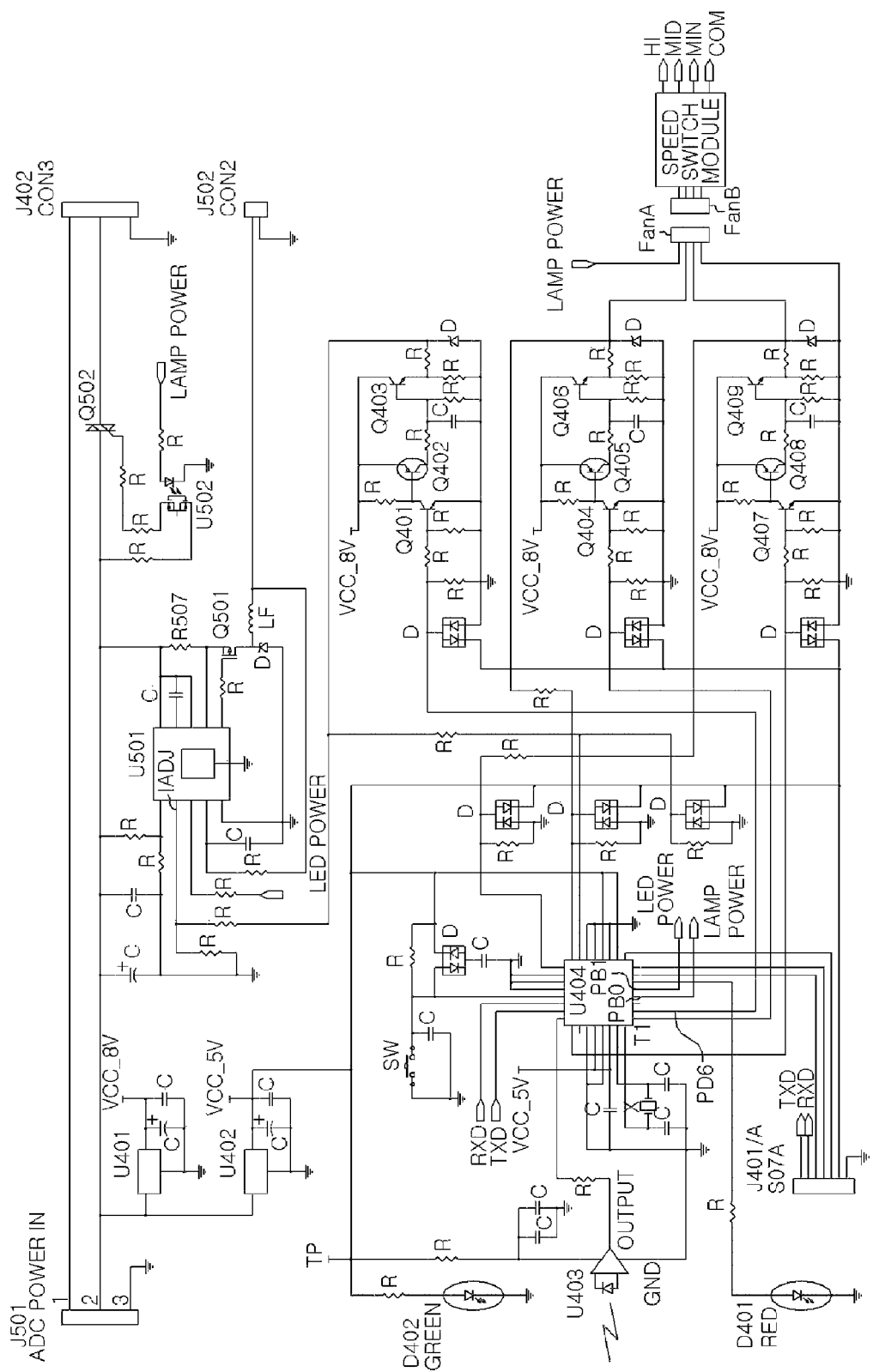
FIG. 5 is a circuit diagram illustrating a power control module for AC and DC illumination, according to an embodiment of the present invention.

FIG. 4 is a circuit diagram of a peripheral circuit of a power control module for AC and DC illumination, according to an embodiment of the present invention. FIG. 5 is a circuit diagram illustrating the power control module for AC and DC illumination, according to an embodiment of the present invention.

Referring to FIG. 4, in the power control module for illumination, wirings are arranged separately for AC power and DC power, and AC illumination and DC illumination that connect to the respective wirings may be used at the same time, and each illumination may be individually controlled by using a remote controller including a microcontroller circuit that drives an infrared (IR) sensor. A switch according to the conventional art functions as a main switch. In addition, optionally, as a power supply that is included for a ceiling fan and is designed to be adjustable by using a remote controller is provided, the inconvenience of having to pull a string, which is for adjusting a speed thereof and is mounted therein, may be removed.

Fire or a leakage current due to a high voltage may be prevented by using a DC voltage of 12 V as power for DC illumination, such as in LED illumination, and luminance of the illumination may be adjusted in five stages by using a dimmer circuit.

When a switch is turned on initially, the luminance starts at a first stage, and may be adjusted by moving up through the stages according to necessity. As a flow of a current is increased sequentially, unnecessary power consumption may be reduced to extend the usage time of power of a battery. Also, an instantaneous over-current that flows when turning on the switch may be prevented, thereby protecting an illumination circuit.

Power for AC illumination instruments such as a glow lamp or a florescent lamp facilitates the prevention of an instantaneous over-current that may be generated when turning on the switch, thereby saving energy and preventing damage to an illumination load due to the over-current.

Referring to FIG. 5, AC power and DC power applied from the AC and DC power supply module are supplied to an AC-DC power input terminal J501. Normal AC power is supplied between a hot wire L1 100 and a neutral wire 110 L2-1, and a DC voltage of 12 V or 24 V is input to the neutral wire L2-1 and a ground wire L3 120 so as to turn on an LED lamp by using the DC power in the event of a power failure or an emergency.

The AC power is applied to an AC lamp output terminal J502 through the hot wire L1, and the AC power is applied to a transformer T2 of a switching device Q502 through the neutral wire L2-1 and is output to a transformer T1 by a gate voltage to be output to the AC lamp output terminal J502.

In addition, a voltage of the DC power applied to the neutral wire L2-1 and the ground wire L3 is reduced by using an IC U401 to supply a voltage VCC of 8 V, and power VCC of 5 V for a circuit for controlling power of an AD-DC illumination is supplied through an IC U402. The power of an LED lamp is applied to a source of a switching device Q501 through a resistor R507.

When a voltage VCC of 5 V is applied to the circuit for controlling power of an AC-DC illumination, an LED D402 is lit up to display an available status, and when an IC U404 receives a signal of a remote controller through an IC U403, an LED D401 instantaneously displays that a reception signal is received, and the IC U404 outputs a programmed signal through each terminal thereof, and an output signal of a pin PB1 of the IC U404 is received to turn on an IC U501, and a signal of a pin PD6 is used to adjust a voltage of a pin IADJ of the IC U501 sequentially through switching devices Q401, Q402, and Q403 so as to adjust a gate of the switching device Q501 by using DC power applied to a source thereof and output the DC power through a drain thereof, thereby supplying power for LED lamps both to the AC lamp output terminal J502 and the ground wire GND.

A voltage of a pin PB0 of the IC U404 is used as a signal for switching on or off an AC lamp to adjust a gate of the switching device Q502 and facilitate soft-starts of the AC lamp.

Alternatively, when an AC fan is used, a pin Intl passes through switching devices Q407, Q408, and Q409, and a pin T1 adjusts a speed of the fan using switching devices Q404, Q405, and Q406 through a speed switch module by using a remote controller.

According to the AC-DC power booster of the embodiments of the present invention, noise generated in an SMPS circuit is neutralized, thereby increasing the lifespan of LED lamps. Also, stabilized DC power may be used for street lights, signal lights, and charge-coupled device (CCD) cameras, even in an emergency, and thus, normal appliance/device operation may be secured.

Also, as power may be immediately used just by connecting the power booster to an outlet, according to the embodiments of the present invention, there is no restriction in regard to a place of usage. Moreover, the power booster may be easily installed or detached according to necessity, and is thus appropriate as a measure for preparing restoration of normal power in the event of a disaster. In addition, the power booster may be easily charged by using an external DC energy source such as solar light energy, power of a vehicle, or power produced by wind power generation through an external terminal.

In addition, the power booster may be conveniently used for temporary facilities or outdoor facilities which are frequently moved, and batteries may be configured in a serial or parallel manner according to the purpose of usage, thereby flexibly coping with load capacities. Thus, the power booster may be used in mid- to long-term housing facilities where normal power is not supplied.

In addition, according to a power control module for AC and DC illumination of the embodiments of the present invention, power of an illumination instrument may be controlled to effectively use the illumination instrument, increase the lifespan of the illumination instrument, and reduce electrical energy consumption.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A power control module for alternating current (AC)-direct current (DC) illumination, comprising:
   an AC-DC optical module that receives AC and DC power generated by a Switching Mode Power Supply (SMPS) and applied through a hot wire, a neutral wire, and a ground wire;
   a power switch that controls the hot wire, the neutral wire, and the ground wire and the AC-DC optical module;
   a remote controller that operates the AC-DC optical module; and
   an AC lamp and a light emitting diode (LED) lamp that separately receive the AC and DC power from the AC-DC optical module.

2. The power control module for AC-DC illumination of claim 1, wherein the remote controller includes a microcontroller circuit driving an infrared (IR) sensor so as to allow an independent control of illuminations.

3. The power control module for AC-DC illumination of claim 1, wherein the remote controller is configured to adjust power of a fan, and a speed of the fan is adjustable by using a speed switch module.

4. The power control module for AC-DC illumination of claim 1, wherein the AC power is applied to the AC-DC optical module through the hot wire and the neutral wire, and the DC power is applied to the AC-DC optical module through the neutral wire and the ground wire so as to turn on the LED lamp by using the DC power in the event of a power failure or emergency.

5. The power control module for AC-DC illumination of claim 4, wherein the AC power applied to the AC-DC optical module through the hot wire is supplied to the AC lamp, and the AC power applied to the AC-DC optical module through the neutral wire is supplied to a transformer so as to be output to the AC lamp as a gate voltage.

* * * * *